United States Patent [19]

Motier

[11] Patent Number: 4,527,581

[45] Date of Patent: Jul. 9, 1985

[54] COMPOSITIONS FOR AND METHOD OF REDUCING HYDROCARBON FLUID FRICTION LOSS IN CONDUITS

[75] Inventor: John Motier, Glen Mills, Pa.

[73] Assignee: Atlantic Richfield Company, Los Angeles, Calif.

[21] Appl. No.: 507,308

[22] Filed: Jun. 23, 1983

Related U.S. Application Data

[63] Continuation of Ser. No. 230,775, Feb. 2, 1981, abandoned, which is a continuation-in-part of Ser. No. 142,330, Apr. 21, 1980, abandoned.

[51] Int. Cl.$^3$ ............................................... F17D 1/16
[52] U.S. Cl. ........................... 137/13; 252/8.55 R; 526/348.2; 526/348.3; 526/348.4; 526/348.5; 526/348.6
[58] Field of Search .................... 252/8.3, 8.55 R; 137/13; 166/304; 526/348.3, 348.4, 348.5

[56] References Cited

U.S. PATENT DOCUMENTS

| | | | |
|---|---|---|---|
| 3,215,154 | 11/1965 | White et al. | 137/13 |
| 3,351,079 | 11/1967 | Gibson | 252/855 X |
| 3,682,187 | 8/1972 | Seymour et al. | 137/13 |
| 3,692,676 | 9/1972 | Culter et al. | 252/8.55 |
| 4,212,312 | 7/1980 | Titus | 137/13 |

FOREIGN PATENT DOCUMENTS 1267604  3/1972  United Kingdom.

*Primary Examiner*—Herbert B. Guynn
*Attorney, Agent, or Firm*—Coleman R. Reap

[57] ABSTRACT

Friction loss normally occurring in hydrocarbon carrying conduits during the transportation of hydrocarbon liquids is reduced by adding to the hydrocarbon liquids small amounts of copolymers of butene-1 and another alpha-monoolefin having 5 to 20 carbon atoms.

7 Claims, No Drawings

COMPOSITIONS FOR AND METHOD OF REDUCING HYDROCARBON FLUID FRICTION LOSS IN CONDUITS

CROSS REFERENCE

This is a continuation of application Ser. No. 230,775, filed Feb. 2, 1981, now abandoned, which in turn is a continuation-in-part of application Ser. No. 142,330, filed Apr. 21, 1980, now abandoned.

BACKGROUND OF THE INVENTION

1. Field of the Invention

This invention relates to a method of increasing the flow of hydrocarbon liquids through conduits. More particularly, it relates to a method of increasing the flow rate of hydrocarbon liquids such as crude oil in conduits such a pipelines by reducing the frictional resistance of the hydrocarbon liquid flowing in the conduit.

2. Prior Art

When fluids are pumped through a conduit, such as a pipeline, friction resulting from the movement of the fluid over the inside surface of the conduit causes a pressure drop in the fluid which increases as the downstream distance from the pump increases. Because of the loss in pressure, it is usually necessary to install additional pumps at selected points along the pipeline to keep the fluid moving at the desired rate in the conduit. Sometimes it is desirable to increase the throughput of fluids through conduits but this cannot always be satisfactorily accomplished by installing additional booster pumps. The flow rate of the fluid through the conduit can also be increased by reducing the friction of the fluid in the conduit. Accordingly, it would be desirable to find an efficient technique for reducing the pressure loss due to friction, commonly referred to as "friction loss" or "drag."

One method of reducing friction loss in fluids moving through conduits is to inject into the fluid a substance which is capable of reducing the friction loss of the fluid moving through the conduit. Such substances must not only reduce the friction loss of the fluid, but must be compatible with the fluid and must not interfere with the intended use of the fluid.

Recent shortages in imported crude oil have made it necesssary to increase the flow of crude oil moving through existing pipelines from domestic oil fields to refineries. Studies have been undertaken to find substances which meet the requirements stated above. It has been discovered that certain oil-compatible polymeric substances have been used with some success in reducing friction loss in crude oil through pipelines. U.S. Pat. No. 3,692,676 discloses the reduction of friction loss in hydrocarbon liquids flowing through pipelines by adding to such liquids small amounts of homopolymers or copolymers of alpha-olefins having from 6 to 20 carbon atoms. Even though such additives may effect drag reduction in hydrocarbon liquids flowing through conduits they are costly to use since the described polymers are prepared from monomers which are expensive and not readily available in large quantities.

Oil-compatible drag reducing agents have been prepared from less costly monomers but these generally have not been completely satisfactory, often for such reasons as their inability to sufficiently reduce the friction loss of the flowing liquid or their propensity to undergo excessive shear degradation under actual field conditions. In this category are drag reducing agents disclosed in U.S. Pat. No. 3,215,154, which teaches the use of polyisobutylene as a hydrocarbon liquid friction loss reducing agent; U.S. Pat. No. 3,434,485, which discloses the use of low molecular weight polybutene to reduce friction loss in a crude oil pipeline; U.S. Pat. Nos. 3,351,079; 3,493,000; 3,559,664 and 3,682,187, which disclose the addition of copolymers of ethylene and propylene or other low molecular weight alpha-monoolefin to to hydrocarbon fluids as fluid flow friction loss reducing additives; and U.S. Pat. No. 3,454,379, which describes the addition of low molecular weight polyethylene to distillate hydrocarbon fuel oil to improve the pumpability of the fuel oil.

An efficient method of reducing the friction loss of hydrocarbon liquids flowing in conduits using inexpensive chemical additives which do not undergo significant shear degradation has now been discovered. Accordingly, it is an object of the invention to present an improved method of reducing friction loss in hydrocarbon fluids flowing through conduits. It is another object of the invention to present an inexpensive and efficient method of reducing friction loss in hydrocarbon fluids flowing through conduits. It is another object of the invention to present novel polymeric compositions having unexpected hydrocarbon pipeline friction reducing properties. It is another object of the invention to present a method of reducing friction loss in a hydrocarbon fluid flowing through a conduit by means of a polymeric additive which does not undergo significant shear degradation under actual field conditions. It is another object of the invention to present an inexpensive and efficient method of reducing the friction loss in crude oil flowing through pipelines. These and other objects of the invention are supported in the following description and examples.

SUMMARY OF THE INVENTION

New compositions have been discovered which significantly attenuate friction resistance in hydrocarbon pipelines. According to the invention the friction loss of hydrocarbon fluids flowing in conduits is reduced by injecting into the hydrocarbon fluids small amounts of high molecular weight copolymer compositions prepared from butene-1 and one or more other alpha-monoolefins having 5 to 20 carbon atoms. The copolymers of the invention desirably have an average molecular weight of 100,000 or more and their average molecular weights are usually in the range of about 100,000 to 20 million. The copolymer in the compositions of the invention generally comprises about 10 to 90 mole percent of $C_4$ hydrocarbon units and about 90 to 10 mole percent of units derived from the other alpha-monoolefin component. The copolymer composition is added to the hydrocarbon fluid at a concentration which is effective to produce the desired friction loss reduction. In preferred embodiments of the invention the alpha-monoolefin component which is copolymerized with the butene-1 has 6 to 14 carbon atoms, the copolymer in the composition contains 25 to 75 mole percent $C_4$ hydrocarbon units, the copolymer composition is added to the hydrocarbon fluid at a polymer concentration of about 2 to 500 ppm and the copolymer has an average molecular weight in the range of about 500,000 to 10 million. Preferred copolymers for use in the invention are those prepared with butene-1 and one or more hexene-1, octene-1, decene-1, dodecene-1 and tetradecene-1.

DETAILED DESCRIPTION OF THE INVENTION

The copolymers useful in the invention may be prepared by copolymerizing butene-1 with at least one other alpha-monoolefin having 5 to 20 or more carbon atoms. Alpha-monoolefins having more than 20 carbon atoms may be used in preparing compositions of the invention, however, they are not as desirable as the lower molecular weight monomers because of their high costs and their lower polymerization reactivities. The preferred alpha-monoolefins are those having 6 to 14 carbon atoms. Particularly useful alpha-monoolefins are hexene-1, octene-1, decene-1, dodecene-1 and tetradecene-1.

The method of copolymerization of the monomers is not a part of the invention. In general, any of the several well known methods for polymerizing alpha-monoolefins can be employed. A particularly suitable method is the Ziegler process using catalyst systems comprising combinations of a compound of a metal of Groups IV-B, V-B, VI-B or VIII of the Periodic Chart of the Elements found on pages 392–393 of the Handbook of Chemistry and Physics, 37th Edition with an organometal compound of a rare earth or metal from Groups I-A, II-A, III-B of the Periodic Chart of the Elements. Particularly suitable catalyst systems are those comprising titanium halides and organoaluminum compounds. A typical polymerization procedure is to contact the monomeric mixture with the catalyst in a suitable inert hydrocarbon solvent for the monomers and the catalyst in a closed reaction vessel at reduced temperatures and autogenous pressure and in a nitrogen atmosphere. Further details of the Ziegler process are set forth in U.S. Pat. No. 3,692,676.

The total $C_4$ hydrocarbon concentration in the copolymers of the drag reducing compositions of the invention desirably varies from about 90 mole percent to about 10 mole percent. The factor limiting the upper concentration of butene-1 in the copolymers of the invention is solubility. As the butene-1 concentration in the copolymers increases, the crystallinity increases and the solubility of the copolymers in hydrocarbons decreases. Decreasing solubility has an adverse effect on the drag reducing effectiveness of the copolymers. The solubility limits of copolymers varies, of course, with different copolymer systems. In general, the practical upper butene-1 content limit for useful drag reducing copolymers is about 90 mole percent. Copolymer compositions having $C_4$ concentrations exceeding about 90 mole percent have relatively poor drag reducing properties and shear degradation resistance. On the other hand the economic advantage of using the less expensive butene-1 in the preparation of the copolymer compositions is lost if the $C_4$ hydrocarbon incorporation in the polymer drops below about 10 mole percent. In preferred embodiments of the invention the total $C_4$ hydrocarbon concentration is about 25 to 75 mole percent and the total concentration of alpha-monoolefin having 5 to 20 carbon atoms is about 75 to 25 mole percent. Those skilled in the art will appreciate the fact that small amounts of the butene-1 may incorporate into the copolymer composition as homopolymer and that the abovestated $C_4$ hydrocarbon concentrations refer to the total $C_4$ hydrocarbon content of the copolymer compositions and includes butene-1 homopolymer and butene-1 present in copolymer form. On a weight basis copolymers coming within the scope of the invention are those having about 10 to 90 weight percent butene-1 and preferably about 25 to 75 weight percent butene-1. The optimum butene-1 concentrations will, of course, vary depending on which momoner or monomers are used as the other alpha-monoolefin component.

As noted above, high molecular weight copolymers are used in the compositions of the invention. The only limitation on molecular weight is that it must be high enough to produce effective drag reduction. In general, the effectiveness of the drag reducing compositions increases as the molecular weight increases. On the upper end of the scale the molecular weight of polymers useable in the invention is limited only by the practicability of of making the copolymers. The average molecular weight of desirable copolymers is usually over 100,000 and is generally in the range of about 100,000 to about 20 million. The average molecular weight of copolymers used in the invention is preferably in the range of about 500,000 to 10 million and most preferably in the range of about 1 to 5 million. The molecular weight of polymers can be determined by any one of several methods, some of which provide a weight average molecular weight and others of which provide a number average molecular weight. For the sake of uniformity the term "average molecular weight" as used herein shall mean the weight average molecular weight. The weight average molecular weight can be conveniently determined by any of the well known methods. In the examples described below, the weight average molecular weights were determined by gel permeation chromatography at 135° C. using narrow molecular weight range polystyrene samples as calibration standards and using orthodichlorobenzene as solvent. Number average molecular weights and polydispersities are also listed in the examples. The weight average molecular weight ($M_w$) and the number average molecular weight ($M_n$) relate to each other according to the equation $$M_w = M_n \times \text{Polydispersity}$$

The amount of polymer required in the hydrocarbon fluid, expressed as ppm (parts by weight of copolymer per million parts by weight of hydrocarbon fluid), to produce the desired result will vary depending upon the physical properties and composition of the hydrocarbon fluid. In some hydrocarbon fluids the desired result may be obtained by the addition of 2 ppm or less of the polymer to the hydrocarbon fluid. On the other hand some hydrocarbon fluids may require as much as 1000 ppm or more of polymer additions to produce the desired result. It has been found that the desired result is usually obtained by the use of 1000 ppm or less, and its often preferred to add the copolymer to the hydrocarbon fluid in amounts of about 2 to 500 ppm and most preferably in amounts of about 5 to 200 ppm.

It should be understood that the above concentrations are based on the total weight of polymeric components in the composition. The weight of additives, such as diluents, is not included in the measurements. Since the copolymer is a solid at the stated molecular weight it is usually preferred to dissolve it in a suitable solvent or suspend it in a suitable diluent prior to use since it is easier to add to the hydrocarbon fluid in the form of a solution or a slurry. Suitable solvents and diluents include kerosene, naptha and other petroleum distillates and inert hydrocarbons, such as heptane, octane, etc.

Other additives which can be included in the polymeric compositions of the invention are dyes, rust inhibitors, antistatic agents, etc.

The copolymer compositions can be conveniently added to the hydrocarbon fluid by continuous injection into the conduit carrying the hydrocarbon fluid by means of proportionating pumps situated at desired locations along the conduit. The copolymer compositions are ideally suited for increasing the flow rate of crude oil in pipelines.

The following examples illustrate specific embodiments of the invention. Unless otherwise stated parts and percentages are on a weight basis. The amount of polymer formed is measured by carbon 13 nuclear magnetic resonance analysis and the weight average molecular weight and the number average molecular weight of the polymeric products is determined by gel permeation chromatographic analysis, as described above.

EXAMPLE I

Into a two liter stainless steel reactor which has been purged with nitrogen and which is equipped with a thermocouple, an agitator and a cooling jacket is charged 225 gms of kerosene which has been previously purified by passage through a bed of molecular sieve, 0.67 mole of dodecene-1, 13.7 mls of 25 weight percent solution of diethyl aluminum chloride in heptane and 1.5 gms of aluminum-activated titanium trichloride. Under a nitrogen blanket 0.67 mole of purified butene-1 is charged to the reactor. The reactor is sealed and the reactor pressure is adjusted to 20±5 psig with nitrogen and the reactor temperature is reduced to 10° C. The reaction begins immediately upon addition of the reactants and catalyst. During the course of the reaction the temperature is maintained at 10±1° C., the pressure is autogenous and the reactor contents are agitated sufficiently to ensure a uniform temperature throughout the reaction mixture. One hour after the reaction begins, 164 gms of purified kerosene is added to the reactor to reduce the viscosity of the reaction mixture which increases as polymeric product is formed. After the kerosene addition the reaction is permitted to proceed for an additional four hours during which time no further viscosity reduction is necessary. The reaction is then terminated by the addition of sufficient alcoholic sodium hydroxide to completely inactivate the catalyst. The reaction product is stabilized by the addition of 200 ppm of a phenolic type antioxidant.

The conversion of monomer to polymer is 24%. The polymeric product contains 51 mole percent $C_4$ hydrocarbon units and 49 mole percent $C_{12}$ hydrocarbon units. The polymeric product has a number average molecular weight of 1.14 million, a polydispersity of 4.5, and a weight average molecular weight of 5.13 million.

EXAMPLE II

The procedure of Example I is repeated except that the reaction is conducted in the temperature range of −3° to −6° C. for a period of twenty hours.

The conversion of monomer to polymer is 35%. The polymer in the product contains 52 mole percent of butene units and 48 mole percent of dodecene units and has a number average molecular weight 1.44 million, a polydispersity of 3.8. and a weight average molecular weight of 5.47 million.

EXAMPLE III

The procedure of Example II is repeated except that the monomer charge comprises 0.89 mole of hexene-1 and 1.34 moles of butene-1, the amount of diethyl aluminum chloride is 9.1 mls of 25 weight percent solution and the reaction is carried out for eight hours.

The conversion of monomer to polymer is 15%. The polymer in the product contains 56 mole percent $C_4$ hydrocarbon units and 44 mole percent $C_6$ hydrocarbon units and will have a number average molecular weight above 1 million.

EXAMPLE IV

The drag reducing efficiency of the polymer compositions compared in Examples I to III is determined by comparing the pressure drop which occurs when a sample of crude oil containing a test drag reducing agent (DRA) is pumped through a test loop with the pressure drop which occurs when the same crude oil, but containing no DRA, is pumped through the test loop. The crude oil is from the Sadlerochit formation, Prudoe Bay, Alaska, and has an API gravity of 27°. The test loop is one hundred feet long and is constructed of one inch nominal pipe. The polymer compositions are added to the crude oil as 5 weight percent solutions in kerosene. Test samples are prepared by blending 45.4 gms of the 5 weight percent polymer solution with 500 pound batches of the crude oil for two hours. The resulting mixture contained 10 ppm polymer. The blended mixture is forced through the test loop using water as the pumped displacing fluid. The percentage pressure drop loss (percentage drag reduction) for each test run is calculated from the following formula:

$$\% \text{ Drag Reduction} = \frac{\Delta Pco - \Delta Ps}{\Delta Pco} \times 100$$

wherein Pco is the measured drop which occurs when the crude oil without drag reducing agent is pumped through the test loop and Ps is the measured pressure drop which occurs when a DRA-containing crude oil sample is pumped through the test loop.

The tests were carried out at a number of different linear flow velocities in order to evaluate the efficiency of the DRA's at various flow rates. The test results are tabulated in the following table. During the tests the liquid being pumped is maintained at 140±3° F. Each control run and test run lasted 2 to 3 minutes. The reported pressure drops are the average pressure drops measured during the test period.

TABLE

| Run | DRA | Linear Vel, Ft/Sec. | ΔP, psi | Drag Red., % |
|---|---|---|---|---|
| 1 | none | 7.4 | 14.6 | — |
| 2 | a | 7.4 | 10.0 | 31.5 |
| 3 | b | 7.4 | 8.48 | 41.9 |
| 4 | c | 7.4 | 8.55 | 41.4 |
| 5 | none | 5.6 | 8.90 | — |
| 6 | a | 5.6 | 6.10 | 30.6 |
| 7 | b | 5.6 | 5.20 | 41.5 |
| 8 | c | 5.6 | 5.30 | 40.4 |
| 9 | none | 4.5 | 5.97 | — |
| 10 | a | 4.5 | 4.30 | 28.0 |
| 11 | b | 4.5 | 3.55 | 40.5 |
| 12 | c | 4.5 | 3.75 | 37.2 |

1. The letters a, b and c designate DRA's prepared in Examples I, II and III, respectively.

The results tabulated in the table show that very significant drag reductions are obtained when small amounts of very high molecular weight copolymers of butene-1 and either hexene-1 or dodecene-1 are added to crude oil being pumped through a test pipeline. The results listed also show that significant drag reduction is obtained over a range of linear velocities.

Although the invention is described by certain examples, it is not limited to the specific details of these examples. Other embodiments which are within the spirit of the invention are included. For example, the polymeric drag reduction agent may be prepared from more than two olefinic monomers and the agents of the invention may be used to reduce drag in hydrocarbon liquids other than crude oil. The scope of the invention is limited only by the breadth of the appended claims.

I claim:

1. A process for reducing friction loss in hydrocarbon liquids flowing through conduits comprising adding to the hydrocarbon liquids, in an amount varying from the minimum amount effective to reduce friction loss to about 1000 ppm, a copolymer of butene-1 and at least one other alpha-monoolefin having 5 to 20 carbon atoms and having a weight average molecular weight of at least about 1 million, said copolymer containing about 10 to 90 mole percent units derived from said other alpha-monoolefin component based on the total number of moles of butene-1 and said other alpha-monoolefin component in the copolymer.

2. The process of claim 1 wherein said copolymer is added to the hydrocarbon liquid at a concentration of about 2 to 500 ppm.

3. The process of claim 1 wherein said copolymer contains about 25–75 mole percent butene-1 units based on the total amount of copolymer in the composition.

4. The process of claim 1 wherein said other alpha-monoolefin component has 6 to 14 carbon atoms.

5. The process of either claims 2 or 3 wherein said other alpha-monoolefin has 6 to 14 carbon atoms.

6. The process of claims 1, 2 or 3 wherein said other alpha-monoolefin is hexene-1, octene-1, dodecene-1, tetradecene-1 or mixtures of these.

7. The process of claims 1, 2, 3 or 4 wherein said hydrocarbon liquid is crude oil.

* * * * *